United States Patent Office 2,797,246
Patented June 25, 1957

2,797,246

ORGANIC THIOETHERS

Harry James Barber, Gidea Park, and Maurice Berkeley Green, Hornchurch, England, assignors to May & Baker Limited, Dagenham, England, a British company No Drawing. Application March 7, 1955,
Serial No. 492,739

Claims priority, application Great Britain March 12, 1954

3 Claims. (Cl. 260—609)

This invention relates to new organic ethers and thioethers and particularly to a class of such compounds which have been found to be of especial value as acaricides.

According to the present invention there are provided compounds of the general formula:

$$R_1—X—CH_2—Y—R_2$$

wherein X and Y are the same or are different and each represents an oxygen or a sulphur atom, $R_1$ and $R_2$ represent benzene nuclei of which at least one is substituted by at least one chlorine or fluorine atom such that the total number of halogen atoms in the molecule does not exceed 3, said benzene nuclei being otherwise unsubstituted or further substituted by one or more methyl, methoxy, allyl, cyano, carboxy or nitro groups, and the values of X, Y, $R_1$ and $R_2$ being so selected that the compound is unsymmetrical.

The aforesaid compounds have useful acaricidal activity and are valuable for the control of the eggs and the active stages, including the adult forms of mites (Acari) such as the plant-feeding Tetranychidae or red spider mites e. g. *Tetranychus telarius* L. and *Metatetranychus ulmi* Koch, and exhibit low phytotoxicity.

Of particular value in this connection are the compounds of the aforesaid general formula wherein at least one of X and Y represents a sulphur atom and $R_1$ and $R_2$ are substituted solely by one or more chlorine atoms at least one of which is in one of the para-positions.

Among such compounds are:

4-chlorophenylthio-phenylthio-methane
4-chlorophenoxy-phenylthio-methane
4-chlorophenoxy-4-chlorophenylthio-methane
2-chlorophenoxy-4-chlorophenylthio-methane
2:4-dichlorophenoxy-phenylthio-methane and
2:4-dichlorophenylthio-phenylthio-methane of which the first-mentioned, 4-chlorophenylthio-phenylthio-methane, has outstanding acaricidal activity.

In general the preferred compounds combine activity against the adult stages of the mites superior to that of previously known acaricides with a degree of ovicidal activity comparable with that of the said known substances. Furthermore, the majority of the compounds offer the advantage of being freely miscible with those mineral oils which are themselves used as active acaricides.

According to a further aspect of this invention there are provided acaricidal compositions such as dusts, dispersions and emulsions, which comprise one or more of the compounds provided by the invention in association with solid or liquid diluents of the types commonly used in acaricidal compositions.

In the said compositions there may also be incorporated one or more substances known to be active as acaricides, e. g. 4-chlorophenyl 4-chlorobenzenesulphonate, 4-chlorophenyl 4-chlorobenzylsulphide and 4-chlorophenyl 4-benzylsulphide.

Examples of typical acaricidal compositions according to the invention are:

(a) Wettable powders comprising the active material disposed in a concentration of, for example, up to 40% w./w. in an inert absorbent carrier such as a silicaceous earth together with an ionic or non-ionic wetting and/or dispersing agent such as an alkali metal salt of a long chain aliphatic sulphate, a partially neutralised sulphuric acid derivative of a petroleum oil or of naturally occurring glycerides or a condensation product of an alkylene oxide with an organic acid, (b) self-emulsifying concentrates comprising the active material in solution in a concentration of, for example, up to 80% w./v. in a suitable solvent such as an aromatic hydrocarbon (e. g. xylene), solvent naphtha or a mineral oil together with an ionic or non-ionic wetting and/or dispersing agent, (c) dusts obtained by dispersing the active material in sufficient of an inert absorbent carrier to form a free-flowing powder and diluting this with one or more inert carriers such as talc, diatomaceous earths, wood flours and clays, (d) compositions of the active material of the type commonly employed for the formation of acaricidal smokes, dusts and aerosols.

The concentrated compositions described under (a) and (b) yield, on dilution with water until the concentration of the active material is, for example, from 0.01% to 5% w./v., stable suspensions and emulsions respectively which are suitable for use in the form of a spray.

According to a further feature of the invention, compounds of the stated formula are prepared by condensing a compound of the formula $R_1XCH_2Hal$ (the symbol of Hal representing a halogen atom) with an alkali or alkaline earth metal salt, preferably a sodium salt, of a compound of the formula $R_2YH$. In the condensation an alkali or alkaline earth metal halide is split out. Preferably the halide used is a chloride, i. e. a compound of the formula $R_1XCH_2Cl$. It will be understood that the symbols $R_1$ and $R_2$ have the meanings hereinbefore assigned to them and that the reactants are selected to produce the required unsymmetrical product.

The condensation takes place very rapidly and the reaction conditions are not critical. The best yields are obtained, however, by effecting the condensation in an inert anhydrous solvent medium, e. g. acetone, and preferably at the boiling point of the solvent medium.

The invention is illustrated by the following examples.

*Example I*

Thiophenol (4.25 kg., 38.6 moles) was dissolved under an atmosphere of nitrogen in a solution of sodium hydroxide (1.55 kg., 38.6 mols) in water (10 l.) and the resulting solution evaporated to complete dryness under reduced pressure in a stream of nitrogen. If necessary, benzene (5 l.) may be added and distilled off to remove the last traces of moisture.

Acetone (20 l.) was then added and after the mixture had been stirred under reflux for about 30 minutes a solution of 4-chlorophenylthiomethyl chloride (7.45 kg.; 38.6 moles) in acetone (10 l.) was added to the stirred and refluxing solution over about 2 hours. Stirring and heating were continued for a further three hours and the acetone was distilled off. The residue was treated with water to dissolve the sodium chloride formed and the product was extracted with ether. The extract was washed twice with N caustic soda and then thoroughly with water until neutral. After drying over anhydrous magnesium sulphate, the ether was distilled off and the residue heated for one hour at 100° C./15 mm. Hg to remove impurities and then treated with charcoal and filtered. 4-Cholorphenylthio-phenylthio-methane (10 kg.) was thus obtained as an orange yellow oil suitable for use as an acaricide but which could be further purified by distillation under reduced pressure to give a product boiling at 152–6° C./0.07 mm. Hg.

The following products were similarly prepared using the intermediates $R_2YH$ and $R_1XCH_2Hal$ as defined above:

$$R_1XCH_2YR_2$$

|  | $R_1$ | $R_2$ | B. P., ° C., mm/Hg. | M. P., ° C. |
|---|---|---|---|---|
| (a) $X=Y=O$ | 4-Methylphenyl | 4-Chlorophenyl | 142–3°/0.8 | 40–41 |
|  | 4-Nitrophenyl | ....do.... |  | 81–82 |
|  | 2:4-Di-nitrophenyl | ....do.... |  | 68–69 |
|  | 4-Cyanophenyl | ....do.... |  | 91–92 |
|  | 2-Chlorophenyl | ....do.... | 140–1°/0.7 |  |
|  | 2:4-Dichlorophenyl | ....do.... |  | 65–66 |
|  | 2-Allyl-6-chlorophenyl | ....do.... | 140–2°/0.1 |  |
|  | Phenyl | 2:4-Dichlorophenyl | 137–8°/0.7 |  |
|  | ....do.... | 4-Chlorophenyl | 122–3°/0.7 |  |
| (b) $X=Y=S$ | Phenyl | 2:4-Dichlorophenyl | 160–2°/0.05 |  |
|  | 4-Chlorophenyl | 4-Fluorophenyl | 130–5°/0.02 |  |
|  | ....do.... | 4-Methoxyphenyl | 169–171°/0.06 |  |
|  | Phenyl | 4-Chlorophenyl | 127–9°/0.4 |  |
|  | ....do.... | 2:4-Dichlorophenyl | 143–7°/0.06 | 53–55 |
|  | 2-Chlorophenyl | 4-Chlorophenyl | 148–50°/0.05 |  |
| (c) $X=O, Y=S$ | 4-Chlorophenyl | Phenyl | 137–8°/0.08 |  |
|  | ....do.... | 4-Chlorophenyl | 158–60°/0.08 |  |
|  | 2:4-Dichlorophenyl | Phenyl | 141–2°/0.05 |  |
|  | ....do.... | 4-Chlorophenyl |  | 81–83 |
|  | 2-Allyl-6-chlorophenyl | ....do.... | 148–53°/0.07 |  |
|  | 4-Carboxyphenyl | ....do.... |  | 186–7 |

Example II

Five suspensions of the active substance were prepared by diluting a 5% solution thereof in acetone with a 0.5% aqueous solution of methyl ethyl cellulose to give mixtures containing 0.5% and 0.1% of active material. French bean leaves bearing eggs of *Tetranychus telarius* L. were treated with these suspensions and the following results were obtained:

| Active substance | Percent Egg kill at percent conc. | |
|---|---|---|
|  | 0.5 | 0.1 |
| 4-Chlorophenylthio-phenylthio-methane | 100 | 94 |
| 4-Chlorophenoxy-phenylthio-methane | 100 | 89 |
| 2-Chlorophenoxy-4-chlorophenylthio-methane | 100 | 88 |
| 2-Chloro-6-allylphenoxy-4-chlorophenylthio-methane | 98 | 57 |
| 2:4-Dichlorophenylthio-phenylthio-methane | 100 | 84 |
| 4-Chlorophenoxy-4-chlorophenylthio-methane | 100 | 66 |
| 2:4-Dichlorophenoxy-phenylthio-methane | 98 | 62 |
| 4-Chlorophenoxy-4-cyanophenoxy-methane | 93 | 47 |
| 4-Chlorophenoxy-4-methylphenoxy-methane | 100 | 50 |

Example III

A dispersible powder was prepared by intimate admixture of the following ingredients:

4-chlorophenylthio-phenylthio-methane _____g__ 20
"Celite 281" a finely powdered Siliceous earth__g__ 30
Kaolin _____g__ 10
"Sulphonated Lorol" an ionic wetting agent_____g__ 40 and was admixed with water to form stable suspensions containing 0.05% and 0.02% of active material respectively. These suspensions were sprayed onto apple trees infested with fruit tree red spider mite (*Metatranychus ulmi* Koch) and the following results were obtained.

| | Percent Reduction in adult population at percent concentration | |
|---|---|---|
|  | 0.05 | 0.02 |
| After 4 days | 97 | 94 |
| After 7 days | 100 | 98 |
| After 15 days | 100 | 100 |

Example IV

A self-emulsifying concentrate was prepared from the following ingredients:

4-cholorphenylthio-phenylthio-methane _____g__ 30
White spray oil [1] _____cc__ 56
"Texofor A.4," an emulsifying agent derived from a condensate of ethylene oxide and a higher fatty acid _____cc__ 16
Mixture of "Manoxol N," a proprietary preparation of sodium dinonyl sulphosuccinate (10 g.) and white spray oil [1] (5 cc.) _____cc__ 4

[1] A white mineral oil conforming to the Ministry of Agriculture and Fisheries specification for petroleum oil summer washes for orchard use—Technical Bulletin No. 1, page 31.

and was diluted with water to give a stable emulsion containing 0.02% of active material which was sprayed onto apple trees infested with *Metatetranychus ulmi* Koch.

The following reductions in the adult mite population were observed: after 4 days 85% and after 7 days, 99%.

Example V

Suspensions of 4-chlorophenylthio-phenylthio-methane were prepared as described in Example III but using 20 g. of kaolin and 30 g. of the wetting agent and were applied to French bean plants infested with *Tetranychus telarius* L. The results obtained are given in the table below together with those obtained using suspensions prepared by replacing the active material with the same weight of bis-(4-chlorophenylmercapto)methane, 4-chlorophenyl benzylsulphonate respectively and of a mixture of equal parts by weight of 4-chlorophenylthio-phenylthio-methane and 4-chlorophenyl benzylsulphonate and also with the results obtained using equivalent dilutions of a commercial wettable powder formulation of 4-chlorobenzyl 4-chlorophenyl sulphide known as "Chlorocide."

| Active Substance | Percent Adult Kill at percent conc. | | Percent Egg Kill at percent conc. | |
|---|---|---|---|---|
|  | 0.05 | 0.02 | 0.05 | 0.02 |
| 4 - Chlorophenylthio - phenylthio - methane | 97 | 91 | 100 | 85 |
| Bis-(4-chlorophenylthio)methane | 66 | 58 | 83 |  |
| 4-Chlorophenyl benzylsulphonate | 32 | 36 | 86 | 89 |
| 4 - Chlorophenylthio phenylthio - methane 4-Chlorophenyl benzylsulphonate | 94 |  | 100 | 90 |
| 4-Chlorobenzyl 4-chlorophenyl sulphide | 67 | 48 | 85 |  |

Example VI

A self-emulsifying concentrate was prepared from the following ingredients:

4-chlorophenylthio-phenylthio-methane _____ g__ 30
White spray oil (as described in Example IV)___cc__ 68
Emulsifier¹ _____cc__ 8

¹ A mixture of "Manoxol N" as described in Example IV, 5 parts, "Emulsogen E. L." a condensation product of ethylene oxide and castor oil, 17 parts and "Shell Oil 132" a proprietary brand of mineral oil 5 parts, all parts being by weight.

and was diluted with water to give stable emulsions, containing 0.05% and 0.01% of active material respectively, which were sprayed on French bean plants infested with *Tetranychus telarius* L. The results compared with those obtained using commercial self-emulsifying formulation of 4-chlorobenzyl 4-chlorophenyl sulphide were as follows:

| Active substance | Percent Adult Kill at percent conc. | | Percent Egg Kill at percent conc. | |
|---|---|---|---|---|
| | 0.05 | 0.01 | 0.05 | 0.01 |
| 4 - Chlorophenylthio - phenylthio - methane | 95 | 90 | 100 | 80 |
| 4-Chlorobenzyl 4-chlorophenyl sulphide | 57 | 16 | 100 | 95 |

Example VII

Self-emulsifying concentrates containing 4-chlorophenylthiophenylthiomethane and bis-(4-chlorophenylthio)methane respectively as the active material were prepared from the following ingredients:

Active material _____g__ 30
"Petrochemicals Solvent 15.9/K" a proprietary hydrocarbon solvent _____cc__ 68
Emulsifier¹ _____cc__ 8

¹ A mixture of "Manoxol N," 5 parts, "Emulsigen E. L." 17 parts, both as described in Example VI, and solvent naphtha 2.5 parts, all parts being by weight.

and were diluted with water to form stable emulsions, containing 0.05% and 0.02% of active material respectively, which were sprayed and French bean plants infested with *Tetranychus telarius* L. and the following results were obtained.

| Active Material | Percent Adult Kill at percent concentration | |
|---|---|---|
| | 0.05 | 0.02 |
| 4-Chlorophenylthio-phenylthio-methane | 95 | 90 |
| Bis-(4-chlorophenylthio)methane | 64 | 46 |

Example VIII 4-chlorophenylthio-phenylthio-methane was dissolved in acetone to give a 20% w./v. solution capable of dispersion in the form of an aerosol.

Example IX

Suspensions of 4-chlorophenylthio-phenylthio-methane (compound A) and of 4-chlorophenylthio-4-fluorophenylthio-methane (compound B) respectively were prepared as described in Example III but with concentrations of 0.5 and 0.1% of active material and their activities compared by the method described in Example II. The following results were obtained.

| Active Substance | Percent Egg kill at percent concentration | |
|---|---|---|
| | 0.5 | 0.1 |
| Compound A | 100 | 100 |
| Compound B | 100 | 100 |

We claim:
1. 4-chlorophenylthio-phenylthio-methane.
2. 2:4-dichlorophenylthio-phenylthio-methane.
3. A thioether having the formula:

$$R_1-S-CH_2-S-R_2$$

wherein $R_1$ is a benzene nucleus substituted by at least one but not more than 3 halogen atoms selected from chlorine and fluorine and $R_2$ represents an unsubstituted phenyl radical.

References Cited in the file of this patent
UNITED STATES PATENTS

| | | |
|---|---|---|
| 2,130,990 | Coleman et al. | Sept. 20, 1938 |
| 2,186,367 | Coleman et al. | Jan. 9, 1940 |
| 2,347,393 | Bousquet et al. | Apr. 25, 1944 |
| 2,352,078 | Coleman et al. | June 20, 1944 |
| 2,490,875 | Landau | Dec. 13, 1949 |
| 2,503,207 | Moyle | Apr. 4, 1950 |
| 2,594,480 | Mowry | Apr. 29, 1952 |
| 2,689,869 | Gluesenkamp | Sept. 21, 1954 |
| 2,694,737 | Bock et al. | Nov. 16, 1954 |